(12) United States Patent
Kunjidhapatham et al.

(10) Patent No.: US 8,488,963 B2
(45) Date of Patent: Jul. 16, 2013

(54) LINK DIVERSITY AND LOAD BALANCING ACROSS DIGITAL AND OPTICAL EXPRESS-THRU NODES

(75) Inventors: Ashok Kunjidhapatham, Bangalore (IN); Mohit Misra, Bangalore (IN); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 1015 days.

(21) Appl. No.: 12/165,502

(22) Filed: Jun. 30, 2008

(65) Prior Publication Data

US 2009/0324222 A1 Dec. 31, 2009

(51) Int. Cl.
*H04J 14/00* (2006.01)

(52) U.S. Cl.
USPC .................................. 398/57; 398/45; 398/55

(58) Field of Classification Search
None
See application file for complete search history.

(56) References Cited

U.S. PATENT DOCUMENTS

| | | | |
|---|---|---|---|
| 7,009,934 B1 * | 3/2006 | Perkins et al. | 370/228 |
| 7,606,494 B1 * | 10/2009 | Weston-Dawkes et al. | 398/83 |
| 2003/0147352 A1 * | 8/2003 | Ishibashi et al. | 370/248 |
| 2005/0175353 A1 * | 8/2005 | Morgan | 398/149 |
| 2006/0002291 A1 * | 1/2006 | Alicherry et al. | 370/225 |
| 2011/0052190 A1 | 3/2011 | Lu et al. | |

* cited by examiner

*Primary Examiner* — Kenneth N Vanderpuye
*Assistant Examiner* — Darren E Wolf
(74) *Attorney, Agent, or Firm* — North Weber & Baugh LLP; David L. Soltz (57) ABSTRACT

The present invention provides a system, apparatus and method to compute a route through a network having both digital nodes and optical express-thru nodes. According to various embodiments of the invention, a network topology is generated in which both digital nodes, optical express-thru nodes, and optical nodes are identified, and both physical and virtual links between these nodes are mapped. The network connectivity is identified, at least in part, by broadcasting a local link state advertisement and optical carrier group binding information to neighboring nodes, which enables both physical and virtual neighboring nodes to be identified. Once a topology is generated, both physical and virtual link characteristics are analyzed to ensure link diversity for traffic through the network and load balancing functionality across the network.

20 Claims, 7 Drawing Sheets

LINK DIVERSITY AND LOAD BALANCING ACROSS DIGITAL AND OPTICAL EXPRESS-THRU NODES

BACKGROUND

A. Technical Field

The present invention relates generally to optical communication network systems, and more particularly, to the routing of information within an optical communication system, having both digital and optical express-thru nodes, to ensure path diversity and effective load balancing across the network.

B. Background of the Invention

Optical communication network system may include different types of network elements and nodes. For example, certain optical networks may include both digital nodes and optical-express nodes. Each of the digital nodes has lambda switching capability that enables a digital node to switch wavelengths from one port to another other port. This routing operation requires that a wavelength be converted into the electrical domain, processed, internally routed to a particular port and converted back to the optical domain.

Optical-express nodes do not process optical data within the electrical domain; rather, an optical wavelength(s) is optically transmitted through the node and not terminated in the data plane at the node. For example, an optical-express node may have two ports that are coupled directly to each other by a piece of optical fiber that effectively causes the data plane to bypasses the electrical domain at the particular node. One skilled in the art will recognize that there may be other structures within an optical-express node that allows an optical wavelength(s) to be transmitted through the node within the optical domain.

The location and types of nodes may vary within a network. These nodes may be connected directly or there can be one or more optical amplifiers between them. Two nodes that are not physically adjacent may behave like virtually adjacent neighbors (referred to as "virtual digital neighbors") and maintain virtual connections in which an optical node express-thru node effectively optically forwards traffic within the connection. It is oftentimes a requirement that these digital nodes identify their virtual neighbors when they are not physically adjacent.

Typically, network neighbors (whether digital or optical) are discovered by using a discovery protocol, such as the "HELLO" protocol which is commonly known within the art. This protocol is responsible for establishing and maintaining neighbor relationships and ensuring bidirectional communication between neighboring networks elements.

'Hello' packets are sent to all router interfaces at fixed intervals. When a router sees itself listed in its neighbor's "Hello" packet, it establishes a bidirectional communication. An attempt is always made to establish adjacencies over point-to-point links so that the neighbors' topological databases may be synchronized. However, the traffic engineering topology view of a generalized multi-protocol label-switching ("GMPLS") network provides a data-plane connectivity view of the network, which is represented at an appropriate layer of switching/connectivity capability. This traffic engineering topology gives a view of only digital nodes and not optical express-thru node or optical amplifiers. Thus, it may differ from the physical topology of the network when the digital nodes are not physically adjacent and have optical amplifiers or optical express-thru nodes in between.

It is important that a complete topology be established of the network including both digital nodes and optical express-thru nodes. This complete topology allows for more efficient routing of data through the network and enables a more accurate establishment of link diversity, load balancing and link count across the network.

A failure to provide link diversity within the network lowers the redundancy of the network system and increases its susceptibility to losing large amounts of data if a node was to go down or a piece of fiber was cut. For example, a shared link between a network path and its corresponding redundant path is undesirable because a failure occurring on the shared link could be potentially be fatal to traffic on the path because both the primary and redundant paths are disabled.

A failure to accurately balance traffic through the network may result in bottlenecks that can significantly reduce the performance of the network. An inaccurate link count for the network may result in inefficient overall management of the network because network operations are being based on an incomplete network topology model.

SUMMARY OF THE INVENTION

The present invention provides a system, apparatus and method to compute a route through a network having both digital nodes and optical express-thru nodes. According to various embodiments of the invention, a network topology map is generated in which both digital nodes and optical express-thru nodes are identified, and both physical and virtual links between these nodes are mapped. The network connectivity is identified at least in part by broadcasting a local link advertisement and optical carrier group binding information to neighboring nodes, which enables both physical and virtual neighboring nodes to be identified. Once a topology is generated, both physical and virtual link characteristics are analyzed to ensure link diversity for traffic through the network and load balancing functionality across the network.

In various embodiments of the invention, routes on a network may comprise optical express-thru sites which are adjacent within the network data plane to another node but may or may not be adjacent in the network control plane. Typically, to establish a secure network connection between two terminal nodes, an explicit route is computed using a Constrained Shortest Path First ("CSPF") algorithm with certain constraints from nodes within the network. A redundant path may also be computed that may be used if a failure event occurs on the explicit route. To compute a diverse route between the two terminal nodes, the router ID's of the nodes within the traffic links of the previously computed explicit route are given as exclusion constraints to the CSPF algorithm.

In certain embodiments of the invention, traffic links are discovered within the network by having a node send a link local state advertisement along with its local optical carrier group binding information in a given fiber direction. A remote node receives the link local state advertisement, decodes the optical carrier group binding information, and attempts to match the optical carrier group binding information with the its own local optical carrier group binding information. For each matched optical carrier group, the remote node originates a reply link local state advertisement that results in the creation of a traffic link object on the nodes.

If a link local state advertisement encounters an optical node or optical express-thru node along its path to a remote digital node, the link local state advertisement is simply relayed from one fiber direction to another. These optical nodes and optical express-thru nodes do not terminate optical carrier groups. In other words, the link discovery process will discover only the identity of the two nodes that terminate this link because intermediate nodes are transparent within the network data plane.

In order to support diversity constraints, the link discovery process is extended so that it records a complete trail of resource information from one end of the link to the other. In certain embodiments of the invention, the optical carrier group binding information is extended to include an attribute representing the list of resource information that exists between the two nodes which terminate the link. This attribute is maintained as a resource list, which may be used to build a comparatively more accurate network topology map of the network connectivity.

The optical carrier group binding information is appended to include the resource information of the resource list attribute at each node the link local state advertisement encounters. In express-thru nodes, each expressed optical carrier group has its own resource list attribute that is appended to the link local state advertisement. In optical nodes, all of the optical carrier group bindings in the link local state advertisement share a common resource list attribute that is appended to the link local state advertisement. As a result, for matched optical carrier group binding information in the link local state advertisement, a reply link local state advertisement is originated that creates a traffic link object on all the nodes within the network.

Once the link objects are created and an accurate accounting of the links within the network is determined, link diversity may be ensured. One manner in which link diversity is ensured is by providing true constraint criteria to a CSPF algorithm that accounts for virtual links (i.e., links having an optical express-thru node) as well as direct physical links. However, one skilled in the art will recognize that various network controllers and network path computation modules may use the network topology map in many ways to ensure link diversity across the network.

The network topology map may also be used to improve the traffic load balancing across the network. Because a complete listing of the links within the network has been established, the link bandwidth capacities and availabilities within the network may be more effectively managed and the network performance improved.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The present invention provides a system, apparatus and method to compute a route through a network having both digital nodes and optical express-thru nodes. According to various embodiments of the invention, a network topology is generated in which both digital nodes, optical express-thru nodes, and optical nodes are identified, and both physical and virtual links between these nodes are mapped. The network connectivity is identified, at least in part, by broadcasting a local link state advertisement and optical carrier group binding information to neighboring nodes, which enables both physical and virtual neighboring nodes to be identified. Once a topology is generated, both physical and virtual link characteristics are analyzed to ensure link diversity for traffic through the network and load balancing functionality across the network.

The following description is set forth for purpose of explanation in order to provide an understanding of the invention. However, it is apparent that one skilled in the art will recognize that embodiments of the present invention, some of which are described below, may be incorporated into a number of different computing systems and devices.

The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A digital node within an optical network is defined as a node in which the traffic data is converted to the electrical domain, processed within the digital node and optically transmitted back onto the network. Stated another way, a digital node terminates traffic within the data plane of the network. Comparatively, an optical express-thru node is defined as a node in which traffic data remains within the optical domain as it travels through the node. In certain embodiments of an optical express-thru node, the network control plane may be terminated at the node but the data plane is optically transmitted through the node. An example of optical express-thru connectivity is a first optical port on a node being directly coupled to a second optical port on the node by an optical fiber patch cable or a reconfigurable optical add-drop multiplexer.

The digital nodes are configured to exchange control information between the nodes (optical and digital). These control messages may include local binding information that contains data about a local transmitter node or information about time slots that are allotted in the digital nodes for adding or dropping the traffic. Effectively, this binding information allows nodes to intelligently process traffic between each other. In the electrical domain, the data can be processed, updated, or have forward error correction applied in the node before wavelengths are routed.

Path or span characteristics through the network may vary depending on the number of digital nodes and optical express-thru nodes present in a particular connection. Additionally, other intermediary devices within the connection, such as amplifiers and regenerators, may also affect the characteristics of the connection including the connection latency and noise characteristics. These devices may be intermediary devices and transparent on a network data plane but nevertheless be present on the network control plane. The process of generating the network topology map, including the discovery of peer digital network elements, is able to account for these optical, lower-layer nodes. As a result, true link diversity and accurate load balancing may be provided because of the relatively-more accurate network topology map that may be generated.

According to various embodiments of the invention, a wavelength switching interface at a node sends a local link state advertisement to its immediate control neighbor on one or more optical service channels. This local link state advertisement is a discovery request comprising identification information, such as binding information, that allows other nodes to identify the source of the advertisement and its attributes. The local link state advertisement may contain information such as the number of optical carrier groups in the physical link, and the properties of each of the optical carrier groups including advertising router ID, interface index, band ID, optical carrier group ID, channel usage bandwidth, etc.

If the receiver of this advertisement is a digital node, it discovers the digital neighbor by matching the received optical carrier group types, within the advertisement, with optical carrier group types that it is supporting. If such a match is found, the neighboring node responds by generating a reply local link state advertisement towards the same control neighbor from where it received the advertisement. If no optical carrier group information match, then neighbor discovery at that node is aborted and a response is not sent.

If the recipient of local advertisement is a lower-layer network element (such as an optical amplifier), then the local advertisement that was received by the lower-layer network element is forwarded in its own link local advertisement towards its next immediate control neighbor. This forwarded advertisement may be transmitted on an optical supervisory channel or channels. The step may then be repeated so if the next immediate control neighbor of the lower-layer network element is a digital network element, it may respond with an advertisement of its own, and the data-plane-adjacent neighbor is discovered. If there is a chain of more than one lower-layer network elements between two digital network elements with wavelength switching interfaces, then a series of local advertisements (e.g., one per lower-layer network element) may be originated and forwarded in the chain until the next digital network element with an lambda switching interface is discovered. A response is provided from the receiving wavelength switching interface and it is subsequently discovered by the originating wavelength switching interface.

According to various embodiments of the invention, a node may provide express connection capability on the optical carrier group level. For example, optical express connections may be provided between ports on banded multiplexing modules at the express-thru node. These banded multiplexing modules are configured to multiplex and demultiplex optical wavelength bands at the node so that individual wavelengths may be processed within the node.

Figure 1:
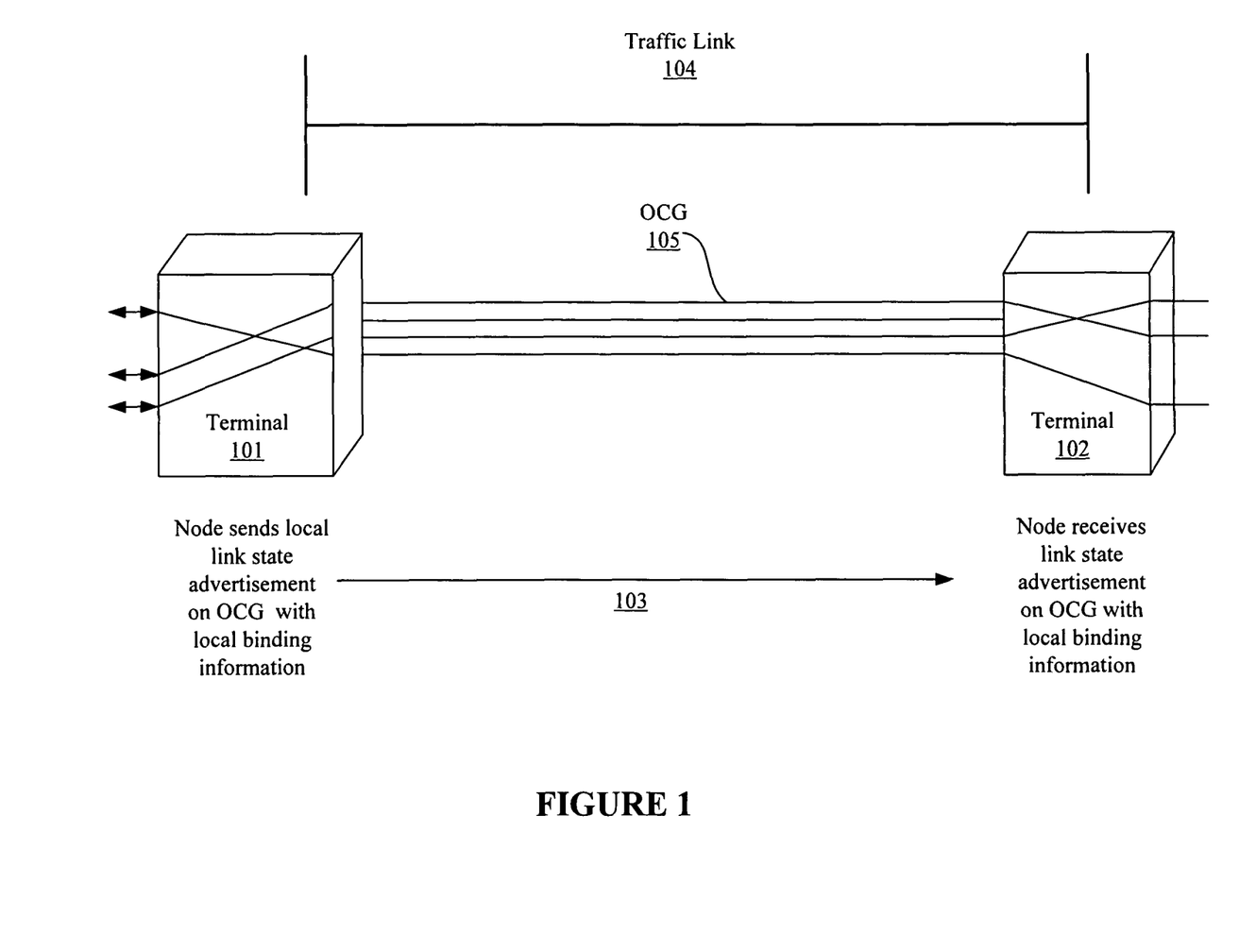
FIG. 1 illustrates the discovery of terminal node elements terminating a traffic link.

FIG. 1 illustrates a discovery process in which an open shortest path first ("OSPF") local link state advertisement is used according to various embodiments of the invention. In particular, a discovery protocol, such as the one previously described, uses an OSPF local link state advertisement to determine a remote end of the traffic link. Digital node 101 sends a local link local state advertisement 103 encoding its identification information, such as local optical carrier group ("OCG") binding information 105 in a particular fiber direction. A remote digital node 102 receives the advertisement and decodes the node OCG binding information 105 to determine whether it matches its own OCG binding information. For each matched OCG, the remote digital node 102 originates a reply local link state advertisement that results in the creation of a traffic link object on the nodes that define certain attributes of the link 104.

Figure 2:
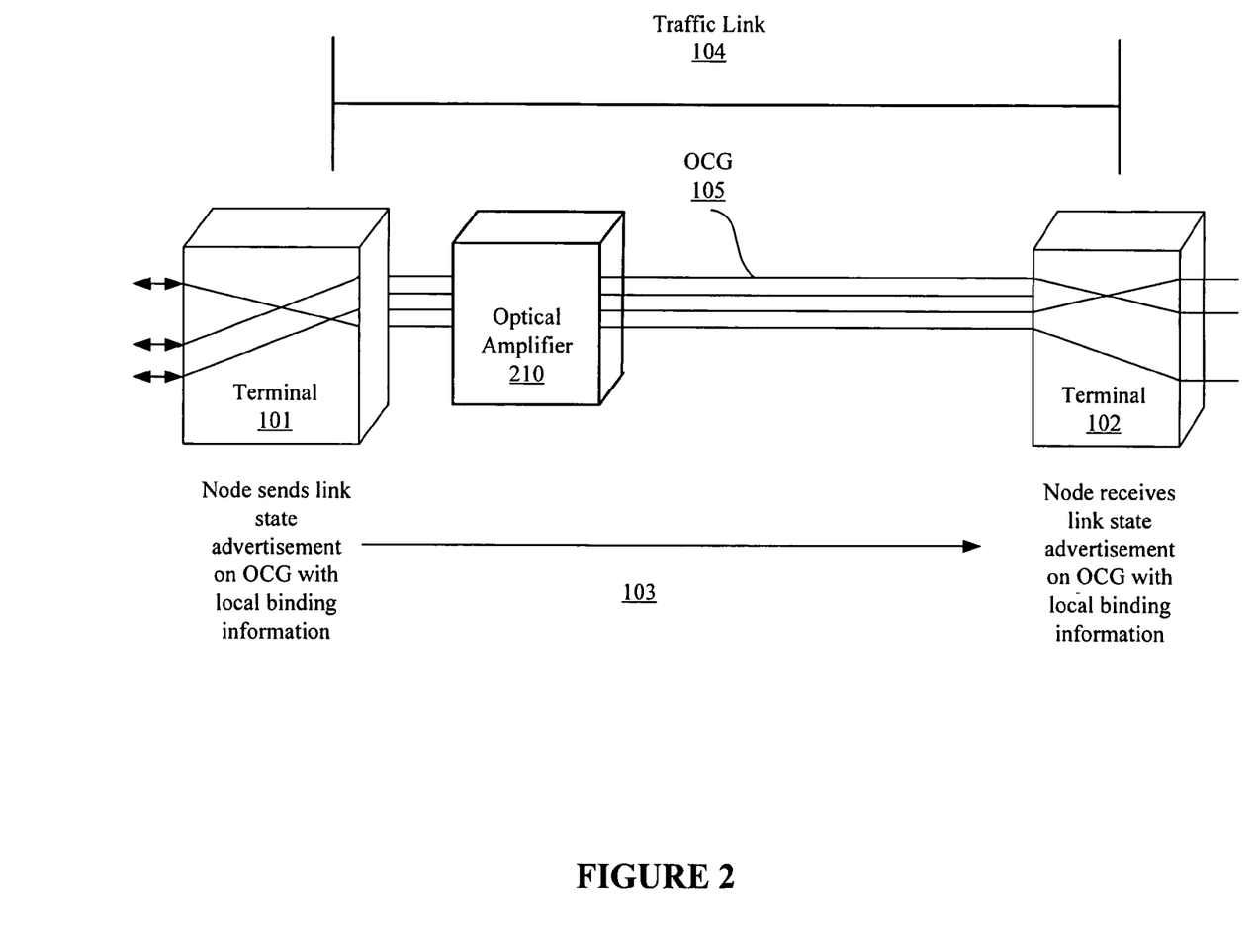
FIG. 2 illustrates the discovery of an intermediate optical amplifier node between terminal nodes according to various embodiments of the invention.

FIG. 2 illustrates this discovery process in which a local link advertisement is used for peer discovery and at least one of the nodes is an optical node according to various embodiments of the invention. The optical node may be an optical amplifier 410 or regenerator that is located between digital node 101 and digital node 102. Preferably, optical amplifiers within the transmission path do not terminate OCGs and the OCG binding information received in the local link advertisement is relayed by the optical amplifier 410. If there are multiple optical nodes within this link, then a series of advertisements are transmitted on the chain until the digital node 102 is discovered.

Figure 3:
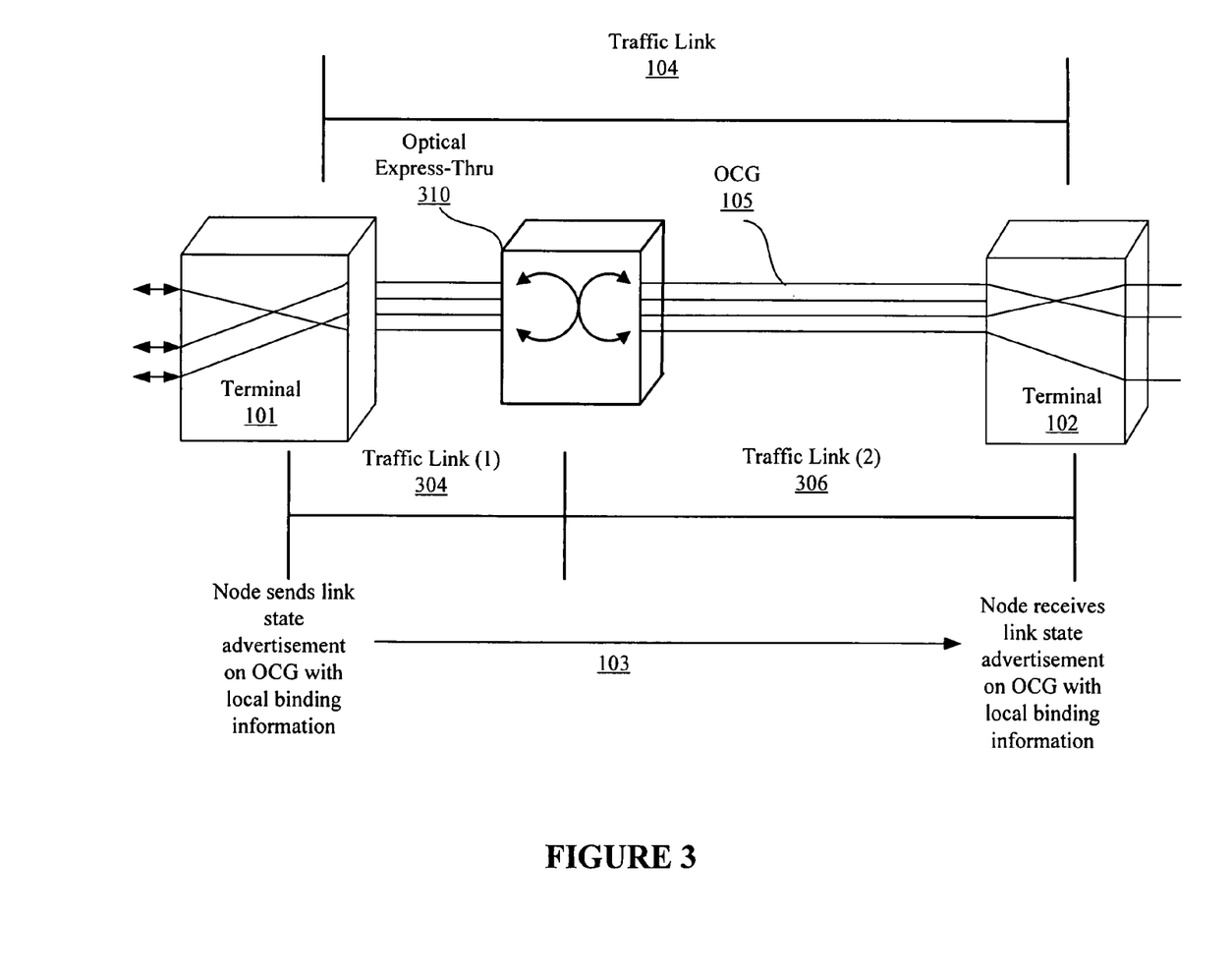
FIG. 3 illustrates the discovery of an intermediate optical express-thru node between terminal nodes according to various embodiments of the invention.

FIG. 3 illustrates this discovery process in which a local link advertisement is used for peer discovery and at least one of the nodes is an optical express-thru node according to various embodiments of the invention. In this example, the network contains an optical express-thru node 310 through which OCGs 105 pass to reach the designated remote digital node 102. As previously discussed, this optical express-thru node 310 may be a node on which ports are directly and optically connected to allow a transfer of traffic only within the optical domain. If one or more OCG links 105 are optically expressed (e.g. banded multiplexing module to banded multiplexing module) at the optical express-thru node 310, then from a traffic link discovery perspective the optical express-thru node 310 appears just like optical nodes within the network because there is not OCG termination at the express-thru node 310 (i.e. transparent to the data plane).

In order to allow the end-to-end traffic link discovery to complete successfully, the optical express-thru node 310 expressly relays the OCG binding information 105 in the link local state advertisement from one fiber direction to another based on the OCG express connectivity. If the optical express-thru node 310 is a digital node, then traffic link (1) 304 will be discovered. The aforementioned steps are subsequently repeated so that traffic link (2) 306 between the optical express-thru node 310 and remote digital node 102 is discovered. Alternatively, if the intermediate node operates as an optical node, then traffic link (2) 306 is identified by the remote node 102.

This information will allow sub-network connections to be setup over the discovered traffic links as long as the inclusion and exclusion constraints supplied by a user do not refer to the components encountered along specific traffic links. Inclusion constraints are a list of data plane resources that should be considered while computing a route using constrained shortest path first (hereinafter, "CSPF") operations. These constraints are supplied to the CSPF by adding to its inclusion list of data plane resources encountered along the path. Exclusion constraints are a list of data plane resources that should be avoided while computing a route using CSPF. These constraints are given to the CSPF by adding to its exclusion list data plane resources encountered along the path.

In yet another embodiment of the present invention, a method to the traffic link discovery mechanism is extended to record a complete trail of resource information from one end of a traffic link to another. The OCG binding information is extended to include a resource list which represents the list of resource information that exists between the two terminal nodes which terminate the link.

Figure 4:
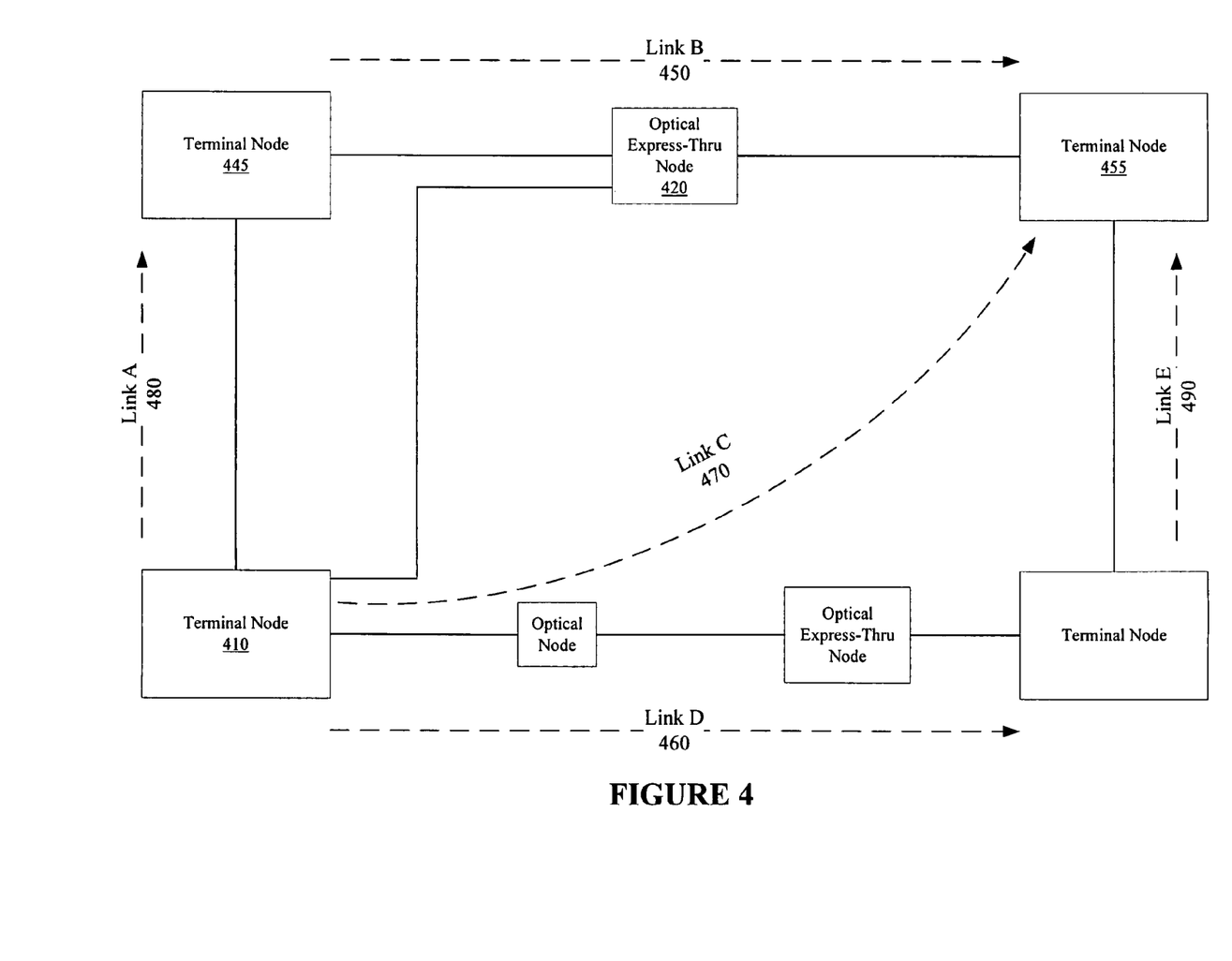
FIG. 4 is an exemplary diagram of a network topology map showing digital nodes, optical express-thru nodes and optical nodes according to various embodiments of the invention.

FIG. 4 illustrates an exemplary optical network having digital nodes, optical express-thru nodes and optical nodes. These different types of nodes are discovered using the traffic link discovery methods described above and an accurate network topology is developed that includes these nodes and the links between them. In this particular example, the network comprises four terminal nodes (digital nodes), optical express-thru nodes and an optical node. A plurality of paths is present which connect the terminal nodes and comprise one or more links.

This topology map allows for a determination of true link diversity and load balancing because of identified optical express-thru nodes as well as an accurate accounting of the links within the network. If an express-thru node is not properly identified, a network path and corresponding fault recovery path may not be truly diverse. For example, if optical express-thru node 420 is not discovered, then a network controller may misidentify paths between terminal node 410 and terminal node 455 as being diverse. A first path may be identified as having link A 480 and link B 450. A second path may be identified as virtual link C 470 because terminal node 410 and terminal node 455 appear as neighboring element due to the failure to identify the optical express-thru node 420. In reality these two paths would not be diverse because they share the last portion of link B 450.

However, if the optical express-thru node 420 was identified, then a third path may be designated that is diverse from either the first or second paths. For example, this third path may comprise link D 460 and link E 490.

Load balancing may be performed based on the accurate count of links as well as the characteristics of those links. For example, a direct path or a path only having a virtual link, such as link C 470, may have less latency than a link having intermediary digital nodes. Accordingly, data may be balanced on these different links according to link type and bandwidth. One skilled in the art will recognize that there are numerous load balancing methods that may be employed to take advantage of the more accurate link count and each link's corresponding characteristics.

Figure 5:
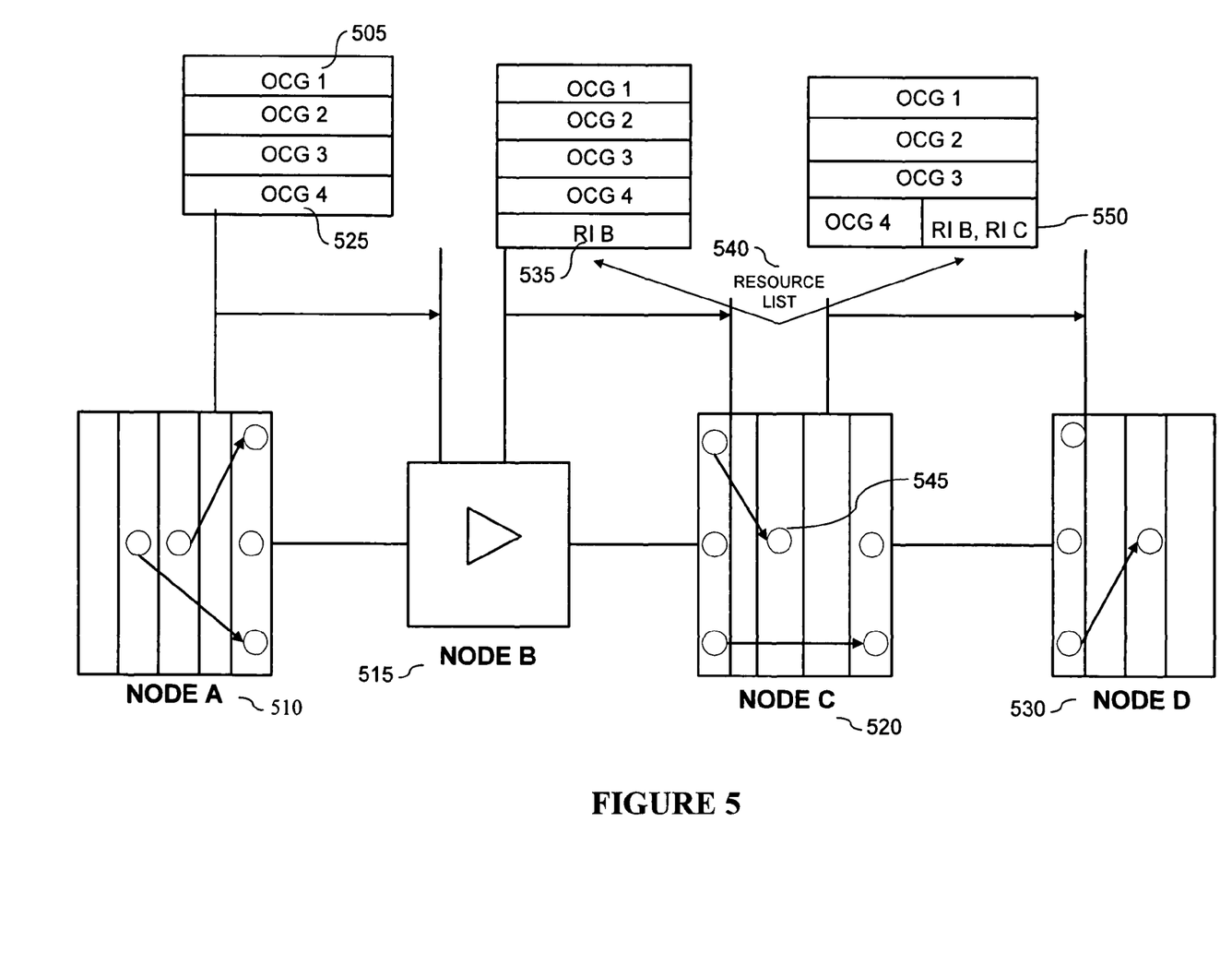
FIG. 5 is a block diagram showing routing of traffic at a port-level according to various embodiments of the invention.

FIG. 5 is a more detailed illustration of node discovery and map topology or resource list generation within a network according to various embodiments of the invention. In this example, line cards or modules within a node are illustrated as digital line modules ("DLMs"), which are described in U.S. Pat. No. 7,079,715, entitled "Transmitter Photonic Integrated Circuit (TxPIC) Chip Architectures and Drive Systems and Wavelength Stabilization for TxPICs," which patent is incorporated by reference in its entirety. However, one skilled in the art will recognize that various types of line cards with many different port configurations may be employed in accordance with embodiments of the invention.

According to various embodiments of the invention, a plurality of OCG signals traverse through a plurality of digital nodes, optical express-thru nodes, and optical nodes within a network. In particular, FIG. 5 illustrates OCG 1 and OCG 4 as having valid OCG binding information whereas OCG 2 and OCG 3 contain null information. To one skilled in the art, the number of valid OCGs a user may implement within the invention is not limited to the number of OCGs illustrated.

OCG 1 505 originates from Node A 510, a terminal node, and passes through Node B 515, an optical amplifier and terminates at Node C 520. OCG 4 525 originates from Node A 510, passes through Node B 515 and Node C 520, which functions as an optical express-thru node, and terminates at Node D 530, a terminal node.

Node A 510 originates a link local state advertisement encoding OCG 1 505 and OCG 4 525 valid identification information, such as binding information. Upon receiving the link local state advertisement from Node A 510, Node B 515 forwards the link local state advertisement to Node C 520 by appending Node B 515 resource information (hereinafter "RI-B") 535 to the resource list 540. Node C 520, upon receiving the updated link local state advertisement from Node B 515, terminates OCG 1 505 at the line module 545 and originates a link local state advertisement reply for OCG 1 505.

Node C 520 also performs the function of encoding the OCG 4 525 binding information along with RI-B 535 and Node C 520 resource information (hereinafter, "RI-C") 550 to the local state advertisement sent to Node D 530. Node D 530, upon receiving the link local state advertisement from Node C 520, terminates OCG 4 525 at the line module 545 and originates a traffic state link reply for OCG 4 525.

To compute a diverse route on the aforementioned network in FIG. 5, router identifications, a global unique identifier is configured on a node in a network of each node in the network and is given as exclusion constraints to the CSPF algorithm. Furthermore, for diverse route computation involving optical amplifier nodes and optical express-thru nodes, the router identifications of the intermediate nodes in the corresponding traffic link are taken from the Link Resource List 540 and give as exclusion constraints to the CSPF algorithm.

Alternatively, the sequence may begin at any node within the network and flow in any fiber direction. For example, the link local state advertisement may originate from Node D 530 such that Node A 510 creates the link local state advertisement reply for OCG 1 505 and OCG 4 525. Furthermore, in yet another embodiment of the present invention, Node B 515 may be an optical express-thru node instead of an optical amplifier node. In such a scenario, the optical express-thru node may function as a reconfigurable optical add drop multiplexer and a diverse route computation will occur, in the aforementioned steps, for each instance the network is reconfigured.

Figure 6:
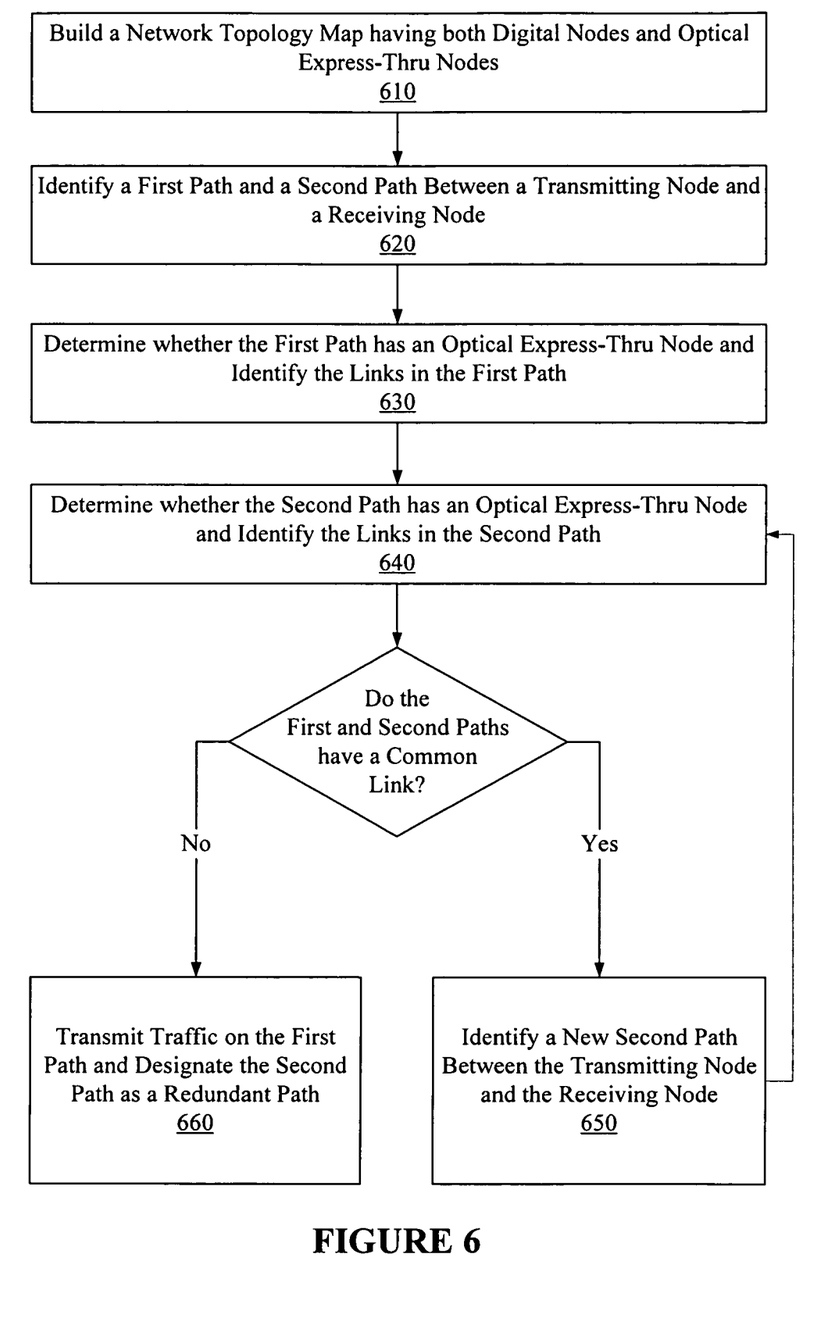
FIG. 6 is a flowchart showing a method for ensuring link diversity between two terminal nodes according to various embodiments of the invention.

FIG. 6 is a flowchart illustrating a method, independent of structure, for identifying link diversity according to various embodiments of the invention. A network topology map is created 610 in which optical express-thru nodes are identified within virtual connection within the network. This network topology map may be created using the resource lists that were developed during the discovery of both digital nodes and optical express-thru nodes. As a result, a plurality of links within each virtual connection is identified and associated with one or more of the optical express-thru nodes.

A first path and a second path are identified 620 between a transmitting terminal node and a receiving terminal node within the network. Using the network topology map, any optical express-thru nodes within the first path are identified 630 and a first set of links within the first path are determined. Additionally, a determination is made whether the second path has the same optical express-thru node as the first path 640 and a second set of links within the second path are determined.

An analysis of the first and second paths is performed to identify whether they include the same optical express-thru node. If there are not any common links in the first and second paths, then the transmitting node starts transmitting 660 traffic on at least the first network path. In certain embodiments of the invention, the second network path is a redundant path that is used if a failure occurs on the first network path. If there is a common link or common optical express-thru node in the first and second paths, then a new second path is identified 650 between the transmitting node and the receiving node, and the new second path is compared to the first path.

Figure 7:
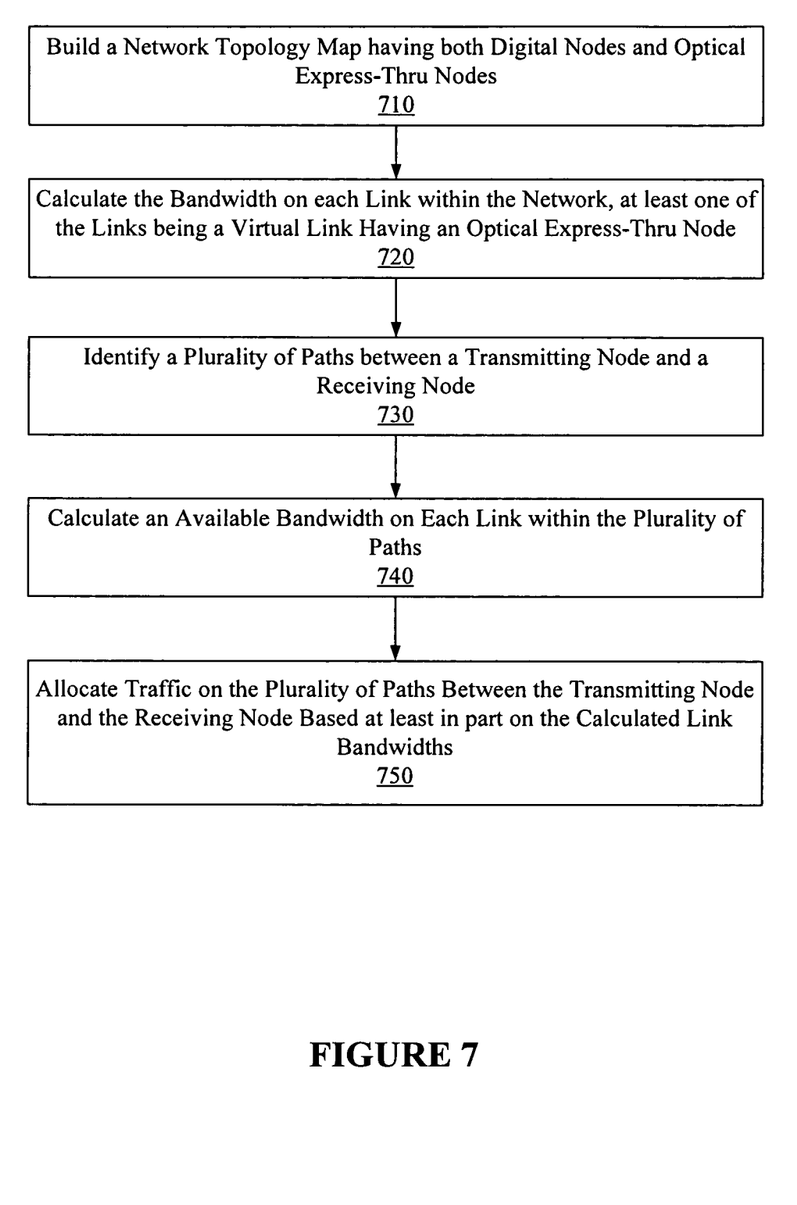
FIG. 7 is a flowchart showing a method for load balancing across a network according to various embodiments of the invention.

FIG. 7 is a flowchart showing a method, independent of structure, for balancing traffic across a network having both digital nodes and optical express-thru nodes according to various embodiments of the invention. A network topology map is created 710 in which optical express-thru nodes are identified within virtual connection within the network. As a result, a plurality of links within each virtual connection is identified and associated with one or more of the optical express-thru nodes.

Using the network topology map, the bandwidth on each link within the network is calculated 720. As previously discussed, the bandwidth across these links may vary depending on whether a link is a virtual link or a direct link. In certain embodiments, other factors of the links may be identified that may be relevant for load balancing operations. For example, noise characteristics and latency may be relevant for load balancing and vary depending on whether a link is a direct link or a virtual link.

A plurality of paths is identified 730 between a transmitting node and a receiving node. At least one of these paths comprises a virtual link that was identified within the network topology map and certain other paths may comprise multiple links. The available bandwidth on each of the links (both direct and virtual links) is calculated 740 which identifies the amount of bandwidth on each link that is currently not in use by other traffic. As previously discussed, the bandwidth on the paths may depend on the number of links within the path as well as the number of direct links versus virtual links.

Traffic between the transmitting node and the receiving node is allocated 750 across the plurality of paths to maximize the traffic throughput between the nodes. One skilled in the art will recognize that various load balancing methods may be employed in this traffic allocation process.

The foregoing description of the invention has been described for purposes of clarity and understanding. It is not intended to limit the invention to the precise form disclosed. Various modifications may be possible within the scope and equivalence of the appended claims.

We claim:

1. A method comprising:
   building, by a computing device, a network topology map identifying a plurality of digital nodes and a plurality of optical express-thru nodes within a network, the plurality of digital nodes including a first digital node and a second digital node connected via a plurality of paths, the plurality of paths including one or more paths that include a particular optical express-thru node of the plurality of optical express-thru nodes, and the network topology being based on:
   first binding information identifying the first digital node, the first binding information being sent via the plurality of paths from the first digital node and being received:
   at the particular optical express-thru node via the one or more paths, and
   at the second digital node via other paths, of the plurality of paths, that exclude the particular optical express-thru node, and
   combined binding information that includes the first binding information and particular binding information identifying the particular optical express-thru node, the combined binding information being sent by the particular optical express-thru node and received by the second digital node via the one or more paths;
   identifying, by the computing device and based on the network topology map, a first path between the first digital node and the second digital node;
   identifying, by the computing device, a second path between the first digital node and the second digital node, the first path and the second path including a third digital node that is between the first digital node and the second digital node;
   determining, by the computing device and based on the network topology map, whether the first path is included in the one or more paths that include the particular optical express-thru node;
   determining, by the computing device and based the network topology map, whether the second path is included in the one or more paths that include the particular optical express-thru node; and
   when both the first path and second path include the particular optical express-thru node, identifying, by the computing device and based on the network topology map, a third path between the first digital node and the second digital node, the third path being included in the other paths that exclude the particular optical express-thru node.

2. The method of claim 1, where the network topology map being further based on:
   a local link state advertisement from the first digital node, and
   a reply local link state advertisement from the second digital node, the reply local link state advertisement including:
   first identification information associated with the second digital node, and
   when the second path includes the particular optical express-thru node, second identification information associated with the particular optical express-thru node.

3. The method of claim 2, further comprising:
   storing a link object on the first digital node, the link object including the first identification information and the second identification information.

4. The method of claim 3, further comprising:
   generating a resource list based on the link object; and
   maintaining the resource list by the first digital node, the resource list including resource information related to the first path.

5. The method of claim 4, where:
   the resource list is one resource list in a plurality of resource lists,
   the plurality of resource lists are located on at least one of the plurality of digital nodes, and
   building the network topology map is based on the plurality of resource lists.

6. The method of claim 1, where network traffic, transmitted between the first digital node and second digital node, is routed exclusively on the first path.

7. The method of claim 1, further comprising:
when the third path is not identified, routing network traffic, between the first digital node and second digital node, onto the second path based on a failure event on the first path, and
when the third path is identified, routing the network traffic onto the third path based on the failure event on the first path.

8. The method of claim 1, further comprising:
transmitting network traffic, routed between the first digital node and the second digital node, on both the first path and the second path.

9. The method of claim 8, where transmitting the network traffic further includes:
selectively transmitting portions of the network traffic on one of the first path or the second path based on respective available bandwidths on the first path and the second path.

10. The method of claim 1, where identifying the first path and identifying the second path include:
performing constrained shortest path first calculations to identify the first path and the second path.

11. The method of claim 10, where performing the constrained shortest path first calculations includes:
using at least one link, included in the first path, as a constraint in the constrained shortest path first calculations.

12. A non-transitory computer-readable medium comprising:
one or more instructions which, when executed by a device, cause the device to build a network topology map identifying a plurality of digital nodes and a plurality of optical express-thru nodes within a network, the plurality of digital nodes including a first digital node and a second digital node connected via a plurality of paths, the plurality of paths including one or more paths that include a particular optical express-thru node of the plurality of optical express-thru nodes, and the network topology being based on:
first binding information identifying the first digital node, the first binding information being sent via the plurality of paths from the first digital node and being received:
at the particular optical express-thru node via the one or more paths, and
at the second digital node via other paths, of the plurality of paths, that exclude the particular optical express-thru node, and
combined binding information that includes the first binding information and particular binding information identifying the particular optical express-thru node, the combined binding information being sent by the particular optical express-thru node and received by the second digital node via the one or more paths;
one or more instructions which, when executed by the device, cause the device to identify, based on the network topology map, a first path and a second path between the first digital node and the second digital node, the first path being different from the second path, the first path and the second path including a third digital node that that differs from the first digital node and the second digital node;
one or more instructions which, when executed by the device, cause the device to determine whether the first path and the second path share the particular optical express-thru node; and
one or more instructions which, when executed by the device, cause the device to identify, when the first and second paths share the particular optical express-thru node, a third path between the first digital node and the second digital node, the third path excluding the particular optical express-thru node.

13. The non-transitory computer-readable medium of claim 12, the network topology map being further based on:
a local link state advertisement from the first digital node, and
a reply local link state advertisement from the second digital node, the reply local link state advertisement including:
first identification information associated with the second digital node, and
when the second path includes the particular optical express-thru node, second identification information associated with the particular optical express-thru node.

14. The non-transitory computer-readable medium of claim 13, where the one or more instructions to build the network topology map further include:
one or more instructions to store a link object on the first digital node, the link object including the first identification information and the second identification information;
one or more instructions to generate a resource list based on the link object;
one or more instructions to maintain the resource list on the first digital node, the resource list including resource information related to the first path; and
one or more instructions to build the network topology map further based on the resource list.

15. The non-transitory computer-readable medium of claim 12, further comprising:
one or more instructions to route network traffic, transmitted between the first digital node and second digital node, exclusively on the first path when no failure event exists on the first path, and
one or more instructions to route the network traffic onto the second path when the failure event exists on the first path and the third path is not identified, and
one or more instructions to route the network traffic onto the third path when the failure event exists on the first path and the third path is identified.

16. The non-transitory computer-readable medium of claim 12, where the one or more instructions to identify the first path and the second path further include:
one or more instructions to identify at least one link to be included in the first path; and
one or more instructions to perform constrained shortest path first calculations, using the at least one link as a constraint, to identify the first path and the second path.

17. A system comprising:
one or more devices to:
receive network traffic associated with a network;
build a network topology map identifying a plurality of digital nodes and an optical express-thru node within the network, the plurality of digital nodes including a first digital node and a second digital node connected via a plurality of paths, the plurality of paths including one or more paths that include the optical express-thru node, and the network topology being based on:
first binding information identifying resource list attributes associated with the first digital node, the first binding information being sent via the plurality of paths from the first digital node and being received:
  at the optical express-thru node via the one or more paths, and
  at the second digital node via other paths, of the plurality of paths, that exclude the optical express-thru node, and
combined binding information that includes the first binding information and particular binding information identifying particular resource list attributes associated with the optical express-thru node, the combined binding information being sent by the optical express-thru node and received by the second digital node via the one or more paths;
identify, based on the network topology map, a first path and a second path between the first digital node and the second digital node, the first path being different from the second path, the first path and the second path including a third digital node that differs from the first digital node and the second digital node;
determine whether the first path and the second path share the optical express-thru node;
identify, when the first and second paths share the optical express-thru node, a third path between the first digital node and the second digital node, the third path excluding the optical express-thru node;
detect a failure on the first path, network traffic being routed on the first path prior to detection of the failure;
route the network traffic onto the second path after the failure is detected and when the third path is not identified; and
route the network traffic onto the third path after the failure is detected and when the third path is identified.

18. The system of claim 17, the network topology being further based on:
  a local link state advertisement from the first digital node, and
  a reply local link state advertisement from the second digital node, the reply local link state advertisement including:
    first identification information associated with the second digital node, and
    when the second path includes the optical express-thru node, second identification information associated with the optical express-thru node.

19. The system of claim 17, where the first path is included in a plurality of first paths that are different, and
  where the one or more devices, when routing the network traffic exclusively on the first path, are further to:
  selectively transmit portions of the network traffic on the plurality of first paths based on respective available bandwidths on the plurality of first paths.

20. The system of claim 17, where the one or more devices, when identifying the first path and the second path, are further to:
  identify at least one link to be included in the first path; and
  perform constrained shortest path first calculations to identify the first path and the second path, where the at least one link, to be included in the first path, is used as a constraint in the constrained shortest path first calculations.

* * * * *